United States Patent [19]
Takahashi et al.

[11] Patent Number: 4,632,840
[45] Date of Patent: * Dec. 30, 1986

[54] PROCESS FOR PREPARATION OF DRESSINGS COMPRISING W/O/W TYPE MULTIPLE EMULSIONS

[75] Inventors: Yasuyuki Takahashi; Shigeru Aizawa; Shigeru Tamai; Toshiro Yoshida; Takeshi Takahashi, all of Tokyo, Japan

[73] Assignee: Meiji Milk Products Company Limited, Tokyo, Japan

[*] Notice: The portion of the term of this patent subsequent to May 20, 2003 has been disclaimed.

[21] Appl. No.: 770,181

[22] Filed: Aug. 28, 1985

Related U.S. Application Data

[63] Continuation-in-part of Ser. No. 610,853, May 16, 1984, abandoned.

[30] Foreign Application Priority Data

Mar. 2, 1984 [JP] Japan ................................. 59-38668

[51] Int. Cl.$^4$ .............................................. A23L 1/24
[52] U.S. Cl. ................................... 426/602; 426/611; 426/612; 426/654; 426/589
[58] Field of Search ............... 426/602, 611, 612, 654, 426/589

[56] References Cited

U.S. PATENT DOCUMENTS

| 2,125,391 | 8/1938 | Musher | 426/602 |
| 2,575,874 | 11/1951 | Herlow | 426/602 |
| 3,615,702 | 10/1971 | Swisher | 426/602 |
| 3,729,325 | 4/1973 | Howard et al. | 426/602 |
| 3,840,682 | 10/1974 | Kubota | 426/602 |
| 3,906,116 | 9/1975 | Quesnel | 426/602 |

FOREIGN PATENT DOCUMENTS

| WO/01270 | 4/1984 | PCT Int'l Appl. | 426/602 |
| 1349404 | 4/1974 | United Kingdom | 426/602 |

Primary Examiner—Jeanette Hunter
Attorney, Agent, or Firm—Browdy and Neimark

[57] ABSTRACT

The present invention relates to a process for preparation of dressings comprising W/O/W type multiple emulsions. Dressings comprising a quite stable W/O/W type multiple emulsions can be obtained by using monoerucin, dierucin, or polyglycerol polycondensed ricinoleic acid ester as the emulsifier. A quite fine W/O/W type emulsion can also be obtained, since an O/W emulsion is subjected to a phase inversion to form a W/O emulsion in the first place.

2 Claims, 1 Drawing Figure

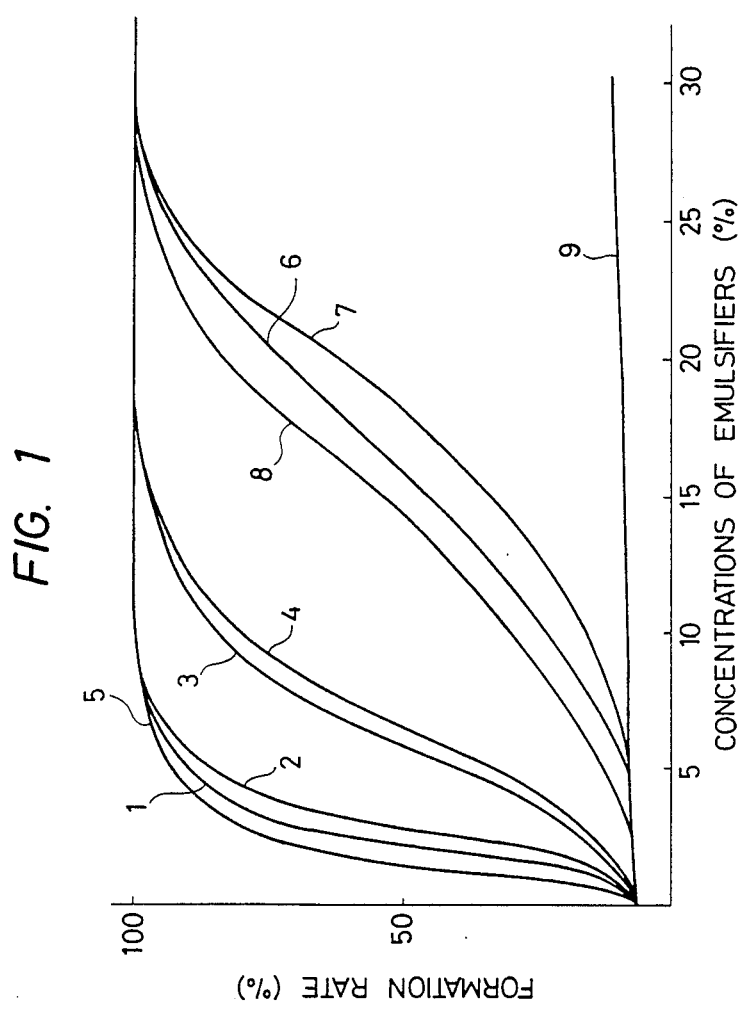

PROCESS FOR PREPARATION OF DRESSINGS COMPRISING W/O/W TYPE MULTIPLE EMULSIONS

The present application is a continuation-in-part of Ser. No. 610,853 filed May 16, 1984, now abandoned.

FIELD OF THE INVENTION

The present invention relates to dressings having an excellent richness.

More particularly, the invention relates to a process for preparation of dressings comprising W/O/W type multiple emulsions such as mayonnaises.

BACKGROUND OF THE INVENTION

Generally, the use of W/O/W type multiple emulsions in the production of various cosmetics, medicines and foods have been expected, since they have a fine texture and a quite smooth touch, a water-soluble substance can be encapsulated in the fat globules in the emulsions and an apparent fat ratio can be increased.

SUMMARY OF THE INVENTION

The present invention relates to a process for preparation of dressings comprising a stable W/O/W type multiple emulsion and having excellent palatability and richness. The invention can also be used as technology to reduce fat and calorie.

The term "dressings" herein involves broadly salad dressings, mayonnaises, French dressings and dips.

BRIEF DESCRIPTION OF THE DRAWING

FIG. 1 shows W/O/W type multiple emulsion-forming rates with various concentrations of emulsifiers determined in Test 1.

DETAILED DESCRIPTION OF THE INVENTION

The emulsifiers used in the present invention include one or more of monoerucin, dierucin and polyglycerol polycondensed ricinoleic acid ester (i.e., polyglycerol polyricinoleate or polyglycerol ester of polycondensed fatty acid of castor oil).

The polyglycerol polycondensed ricinoleic acid ester is represented by the following formula (I).

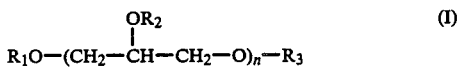

wherein n is 2 to 12, and $R_1$, $R_2$, and $R_3$ each represents a hydrogen or polycondensed ricinoleic acid represented by the following formula (II), provided that at least one of $R_1$, $R_2$, and $R_3$ represents the polycondensed ricinoleic acid of the formula (II).

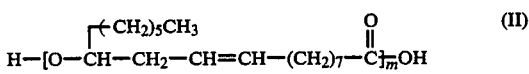

wherein m is 2 to 10.

In the present invention, those properly selected from the polyglycerol polycondensed ricinoleic acid esters represented by the above general formula are used alone or in the form of a mixture of two or more of them.

In the process of the present invention, the emulsifier in an amount of 0.1 to 15%, preferably 1.0 to 10%, particularly 1 to 6%, based on an oil is added to the oil to obtain a mixture. The oil may be any one. In using a hardened oil, it is melted by heating before the use. If necessary, lecithin and/or glycerol difatty acid ester may be added thereto in an amount of about 0.5 to 30% based on the emulsifier.

Water or an aqueous phase is used as the inner aqueous phase for the production of the emulsion. The inner aqueous phase may contain various additives such as proteins, starches, gums, emulsifiers, phosphoric acid and salts thereof, organic acid and salts thereof, coloring agents and seasonings. This inner aqueous phase may be preheated.

In the process for producing the W/O/W type multiple emulsion of the present invention, a W/O type emulsion is first produced. Concretely, the oil phase is added to the inner aqueous phase with the ratio of oil phase to inner aqueous phase being in the range of about 3/1 to ⅓, and the mixture was thoroughly agitated by means of T. K. Homo Mixer (Tokushu Kika Kogyo Co., Ltd, Osaka, Japan) to obtain an O/W type emulsion. This O/W emulsion is subjected to a phase inversion by additional sufficient agitating to form a W/O emulsion. The phase inversion process is preferred, since fine, uniform water droplets can be obtained. During the agitating various additives can be encapsulated in the aqueous phase in the oil. The agitating is effected preferably by means of a powerful homomixer of about 3000 to 8000 rpm. Furthermore, an emulsifying machine such as a homogenizer or an agitating device such as Votator may also be used. It is preferred to heat the W/O emulsion to 50° to 80° C. for facilitating the subsequent emulsification.

The outer aqueous phase of the present invention is prepared as follows: an additive or a mixture of additives are added to water. The additives include, for example, casein, sodium caseinate, gelatin, wheat protein, starch, modified starch, soybean protein, plasma protein, whey protein, albumen, yolk, dextrin, cyclodextrin, starch derivatives, locust bean gum, xanthane gum, pullulan, dextran, curdlan, guar gum, tamarind gum, agar, carrageenan, furcellaran, alginic acid and salts thereof, propylene glycol alginate, pectin, arabinogalactan, crystalline cellulose, CMC, methylcellulose, acacia, tragacanth gum, karaya gum and sodium polyacrylate; as well as orthophosphoric acid, pyrophosphoric acid, polyphosphoric acid and salts of them, common salt, vinegar, organic acids and salts thereof, and emulsifiers. The emulsifier herein used may be any hydrophilic emulsifier. Further, a colorant, seasoning, etc. may be added thereto according to the purpose. The aqueous phase is preferably heated to about 50° to 80° C. so as to facilitate the subsequent emulsification. The order of the addition of the additives is not limited. For convenience's sake in the operation, the W/O emulsion is first charged in an agitator and then the aqueous phase containing the emulsifier and the like is added thereto. The agitator herein used may be any agitator in which the agitating blades do not impact directly the upper W/O emulsion layer so as to obtain a stable W/O/W composite emulsion, such as an agitator having agitating blades at the bottom thereof, a suction-type agitator having agitating blades all over the device, an agitator for only the suction mixing, T. K. Homo Mixer, a homogenizer and Votator.

The aqueous phase is mixed with the W/O emulsion in the agitator at, for example, 250 rpm for 5 min and then the resulting mixture is treated in a homogenizer to obtain a quite fine W/O/W emulsion.

Thus, according to the present invention, a stable W/O/W emulsion containing extremely fine water droplets can be obtained. By using this emulsion, rich mayonnaises, dressings, French dressings and dips can be prepared.

The following tests and examples will further illustrate the present invention.

TEST 2

Dressings containing various oleophilic emulsifiers shown in Table 1 were prepared in the same manner as in Example 1 and the physical properties thereof were compared with one another.

The results of the comparison are shown in Table 1.

TABLE 1

| Emulsifier | Concentration (% based on oil) | Formation rate | Richness | Taste | Smoothness of texture | Stability after 1 week | 2 weeks | 1 month |
|---|---|---|---|---|---|---|---|---|
| Tetraglycerol polycondensed hexaricinoleic acid ester | 4 | O | O | O | O | O | O | O |
| Monoerucin | 4 | O | O | O | O | O | O | O |
| Monolinolein | 4 | O | O | O | O | O | O | O |
| Monoolein | 10 | Δ | Δ | O | O | Δ | Δ | x |
| Diglycerol dioleate | 10 | Δ | Δ | O | O | Δ | Δ | x |
| Sorbitan monooleate | 10 | Δ | Δ | x | O | Δ | Δ | x |
| Glycerol monostearate | 10 | x | x | x | x | x | x | x |
| Monoerucin | 2 | O | O | O | O | O | O | O |
| Sorbitan monooleate | 2 | | | | | | | |
| Tetraglycerol polycondensed hexaricinoleic acid ester | 2 | O | O | O | O | O | O | O |
| Glycerol monooleate | 2 | | | | | | | |
| Monoerucin | 2 | O | O | O | O | O | O | O |
| Diglycerol dioleate | 2 | | | | | | | |

O: good,
Δ: slightly bad,
x: bad

TEST 1

The following emulsifier was added to 300 g of hardened soybean oil heated to 50° C. in an amount of 1 to 30% (varied) based on the oil, and the mixture was stirred to obtain each oil phase.

1. monoerucin,
2. dierucin,
3. monolinolein,
4. dilinolein,
5. tetraglycerol condensed hexaricinoleic acid ester,
6. glycerol monooleate,
7. glycerol dioleate,
8. sorbitan monooleate,
9. glycerol monostearate.

The thus obtained oil phase was added successively to 200 g of water heated to 50° C. to obtain an O/W emulsion, which was then agitated by means of T. K. Homo Mixer at 6000 rpm to effect the phase inversion and to obtain a W/O emulsion.

500 g of water containing 10% of egg yolk and 1% of sodium caseinate was heated to 70° C. The W/O emulsion heated to 70° C. was added to the water. The resulting mixture was agitated in an agitator having agitating blades at the bottom at 250 rpm for 5 min, then treated in a homongenizer at a rate of 40 kg/cm$^2$ and cooled to 5° C.

The W/O/W formation rate of each of the thus obtained W/O/W emulsions was examined to obtain the results shown in FIG. 1. The numerals 1 to 9 stand for the above-mentioned emulsifier.

It is apparent from FIG. 1 that the mulsifiers 1, 2, and 5 were particularly effective in obtaining the W/O/W emulsions.

The W/O/W formation rate was determined according to a method of Matsumoto et al. described in "Yukagaku" 26(10), 655 (1977).

TEST 3

As the emulsifier, polyglycerol polycondensed ricinoleic acid esters having various polymerization degrees of glycerol and condensation degrees of ricinoleic acid each was added to 300 g of hardened soybean oil heated to 50° C. in an amount of 1% based on the oil, and the mixture was stirred.

The resulting mixture was added successively to 200 g of water heated to 50° C. to obtain an O/W emulsion, which was agitated by means of T. K. Homo Mixer at 6000 rpm to effect the phase inversion and to obtain a W/O emulsion.

Then, 500 g of water containing 1% of sodium caseinate and 2% of sorbitan monostearate was heated to 70° C. and the W/O emulsion was added thereto. The resulting mixture was agitated in a stirrer having agitating blades at the bottom at 250 rpm for 5 min, then treated in a homogenizer at a rate of 100 kg/cm$^2$ and cooled to 5° C.

The W/O/W formation rate of each of the thus obtained W/O/W emulsions was examined to obtain the results shown in Table 2.

The W/O/W formation rate was determined according to the method described in Test 1.

TABLE 2

| Polymerization degree of glycerol (n) | Condensation degree of ricinoleic acid (m) | | | | |
|---|---|---|---|---|---|
| | 2 | 3 | 4 | 5 | 6 |
| 2 | 70% | 72% | 72% | 74% | 75% |
| 3 | 75 | 76 | 76 | 77 | 78 |
| 4 | 87 | 93 | 95 | 95 | 94 |
| 5 | 85 | 90 | 94 | 95 | 94 |
| 6 | 88 | 89 | 93 | 95 | 94 |

Each numeral value indicates the W/O/W formation rate (%).

In Table 2, n and m mean the same as those of Formula (I) and Formula (II).

TEST 4

The test was carried out in the same manner as in Test 3, except using mono- or polyglycerol ricinoleic acid ester in an amount of 1% based on the oil instead of polyglycerol polycondensed ricinoleic acid ester in Test 3.

The W/O/W formation rate of each of the thus obtained W/O/W emulsions was examined to obtain the results shown in Table 3.

The W/O/W formation rate was determined according to the method described in Test 1.

TABLE 3

| Polymerization degree of glycerol | Esterification degree of ricinoleic acid (number of molecule) | | | |
|---|---|---|---|---|
| | 1 | 2 | 3 | 6 |
| 1 | 17% | 19% | 0% | —% |
| 2 | 20 | 18 | 12 | — |
| 3 | 23 | 28 | 25 | — |
| 6 | 20 | 28 | 35 | 43 |
| 10 | 18 | 27 | 35 | 42 |

Each numeral value indicates the W/O/W formation rate (%).

It is apparent from Table 3 that each ricinoleic acid ester which is not condensed has a quite low formation rate.

EXAMPLE 1

1000 g of brewed vinegar was added to 3000 g of water. Then, 700 g of corn starch, 200 g of sugar and 90 g of common salt were added to the mixture. The resulting mixture was gelatinized by heating under stirring in a heating tank and then sterilized by heating to 150° C. for 30 sec. 1200 g of egg yolk, 65 g of mustard and other seasonings and spices were added thereto and stirred to prepare an outer aqueous phase.

Separately, 40 g of monoerucin and 4 g of lecithin were added to 2000 g of soybean salad oil heated to 50° C. The mixture was stirred and added successively to 1400 g of water heated to 50° C. The resulting mixture was agitated by means of T. K. Homo Mixer at 6000 rpm for 5 min to effect the phase inversion and to obtain 3400 g of a W/O emulsion.

3400 g of the thus obtained W/O emulsion was heated to 70° C. and added slowly to 6200 g of the above-obtained aqueous phase heated to 70° C. under agitating to obtain a dressing comprising a W/O/W emulsion.

The resulting dressing could be stored stably for a quite long time even at ambient temperature. As compared with an O/W dressing having substantially the same oil content, the dressing obtained as above had an excellent richness.

EXAMPLE 2

3400 g of a W/O emulsion was prepared in the same manner as in Example 1.

Then, 850 g of egg yolk, 130 g of sugar, 75 g of common salt and 50 g of mustard were added to 500 g of brewed vinegar. The mixture was stirred to obtain 1600 g of an aqueous phase.

The W/O emulsion obtained as above was added slowly to the aqueous phase under agitating by means of an agitator. The mixture was homogenized by means of a colloid mill to obtain a W/O/W emulsion-type mayonnaise.

The W/O/W emulsion-type mayonnaise obtained as above could be stored stably for a quite long time even at ambient temperature.

As compared with an O/W mayonnaise having the same oil content, the product had an excellent richness.

EXAMPLE 3

40 g of dierucin was used instead of 40 g of monoerucin in Example 1.

The thus obtained dressing could be stored stably for a quite long time even at ambient temperature. As compared with an O/W dressing having the same oil content, the dressing obtained as above had an excellent richness.

EXAMPLE 4

40 g of dierucin was used instead of 40 g of monoerucin in Example 2.

The thus obtained W/O/W emulsion-type mayonnaise could be stored stably for a quite long time even at ambient temperature.

As compared with an O/W mayonnaise having the same oil content, the product had an excellent richness.

EXAMPLE 5

40 g of tetraglycerol polycondensed hexaricinoleic acid ester was used instead of 40 g of monoerucin in Example 1.

The thus obtained dressing could be stored stably for a quite long time even at ambient temperature. As compared with an O/W dressing having the same oil content, the dressing obtained as above had an excellent richness.

EXAMPLE 6

40 g of tetraglycerol polycondensed hexaricinoleic acid ester was used instead of 40 g of monoerucin in Example 2.

The thus obtained W/O/W emulsion-type mayonnaise could be stored stably for a quite long time even at ambient temperature.

As compared with an O/W mayonnaise having the same oil content, the product had an excellent richness.

What is claimed is:

1. A process for preparing dressings comprising W/O/W two multiple emulsions which comprises mixing an oil phase containing an emulsifier selected from the group consisting of monoerucin, dierucin and polyglycerol polycondensed ricinoleic acid ester with an aqueous phase containing an amount of vinegar effective to season said dressing and agitating the mixture to obtain said dressing.

2. A process for preparation of dressings according to claim 1 wherein the inner aqueous phase and/or the outer auqeous phase comprises water containing one or more of casein, sodium caseinate, gelatin, wheat protein, soybean protein, plasma protein, whey protein, egg white, egg yolk, starch, modified starch, dextrin, cyclodextrin, starch derivatives, locust bean gum, xanthane gum, pullulan, dextran, curdlan, guar gum, tamarind gum, agar, carrageenan, furcellaran, alginic acid and salts thereof, prropylene glycol alginate, pectin, arabinogalactan, crystalline cellulose, CMC, methylcellulose, acacia, tragacanth gum, karaya gum, sodium polyacrylate, pyrophosphoric acid, polyphosphoric acid and salts thereof, common salt, vinegar, sugar, organic acids and salts thereof, emulsifiers, colorants and seasoning.

* * * * *